United States Patent [19]

Broersma

[11] Patent Number: 5,269,025

[45] Date of Patent: * Dec. 14, 1993

[54] REINFORCED EXPANDED PLASTIC HELMET CONSTRUCTION

[75] Inventor: Lester V. Broersma, Bellflower, Calif.

[73] Assignee: Bell Bicycles, Inc., Norwalk, Calif.

[*] Notice: The portion of the term of this patent subsequent to Mar. 31, 2009 has been disclaimed.

[21] Appl. No.: 775,855

[22] Filed: Oct. 15, 1991

Related U.S. Application Data

[63] Continuation of Ser. No. 646,462, Jan. 25, 1991, Pat. No. 5,099,523, which is a continuation of Ser. No. 273,827, Nov. 21, 1988, abandoned, which is a continuation-in-part of Ser. No. 248,616, Sep. 26, 1988, Pat. No. 4,903,348.

[51] Int. Cl.⁵ .................................. A42B 3/04
[52] U.S. Cl. ............................ 2/411; 2/412; 2/421; 2/425
[58] Field of Search ............ 2/183, 410, 411, 417, 2/418, 419, 420, 421, 425, 422, 412, 414, DIG. 6; 264/46.7, 255, 275; 425/4 R, 125

[56] References Cited

U.S. PATENT DOCUMENTS

| | | | |
|---|---|---|---|
| 272,769 | 2/1989 | Sundahl et al. | D2/231 |
| 272,770 | 2/1989 | Sundahl et al. | D2/232 |
| 935,556 | 9/1909 | Smith | 2/171.4 |
| 1,234,589 | 7/1917 | Wells | 2/181.6 |
| 1,347,046 | 7/1920 | McDonough | 2/410 |
| 1,875,143 | 8/1932 | Ponton | 2/412 |
| 2,115,065 | 4/1938 | Dym | 2/412 |
| 2,123,275 | 7/1938 | Dym | 2/412 |
| 2,769,176 | 11/1956 | Grancsay | 2/421 |
| 2,846,683 | 8/1958 | Dye et al. | 2/421 |
| 2,926,356 | 3/1960 | Taylor . | |
| 2,991,478 | 7/1961 | Zbikowski | 2/421 |
| 3,082,428 | 3/1963 | Zbikowski | 2/418 |
| 3,082,485 | 3/1963 | Thomas | 264/255 |
| 3,262,125 | 7/1966 | Bowen . | |
| 3,289,212 | 12/1966 | Morgan | 2/420 |
| 3,310,811 | 3/1967 | Iacono, Jr. | 2/6 |
| 3,344,433 | 10/1967 | Stapenhill | 2/420 |
| 3,425,061 | 2/1969 | Webb | 2/414 |
| 3,465,363 | 9/1969 | Raney | 2/420 |
| 3,467,964 | 9/1969 | Hannen | 2/410 |
| 3,496,854 | 2/1970 | Feldmann et al. | 2/410 |
| 3,582,990 | 6/1971 | Frieder | 2/412 |
| 3,783,450 | 1/1974 | O'Connor | 2/425 |
| 3,873,997 | 4/1975 | Gooding | 2/421 |

(List continued on next page.)

FOREIGN PATENT DOCUMENTS

| | | |
|---|---|---|
| 0042782 | 6/1981 | European Pat. Off. . |
| 0096763 | 5/1983 | European Pat. Off. . |
| 0096148 | 12/1983 | European Pat. Off. ............... 2/411 |
| 280042 | 8/1988 | European Pat. Off. ............... 2/417 |
| 800502 | 11/1950 | Fed. Rep. of Germany . |
| 2941019 | 4/1981 | Fed. Rep. of Germany ......... 2/410 |
| 3235948 | 4/1983 | Fed. Rep. of Germany . |
| 3632525 | 3/1988 | Fed. Rep. of Germany . |
| 2241267 | 3/1975 | France ................................ 2/410 |
| 2108571 | 8/1985 | United Kingdom . |
| 8901744 | 3/1989 | World Int. Prop. O. . |

Primary Examiner—Clifford D. Crowder
Assistant Examiner—Michael A. Neas
Attorney, Agent, or Firm—William W. Haefliger

[57] ABSTRACT

A helmet has a generally dome shaped helmet body with inner and outer sides and a lower edge extending generally in the shape of a loop; an elongated reinforcement member is embedded in the helmet to extend proximate the looping lower edge portion; that member may have band shape; and additional such band shaped reinforcement members may extend within the dome shape of the helmet. Openings may be provided through the body to pass retention straps, a first strap holder configured to be supported at and by the outer side of the helmet, the holder attached to at least one strap that extends through one of the openings, and the holder operable to transmit strap tension to the helmet. The holder typically holds two strap ends, and defines slots through which the straps pass for adjustable retention by the holder.

18 Claims, 6 Drawing Sheets

U.S. PATENT DOCUMENTS

| | | | |
|---|---|---|---|
| 3,925,821 | 12/1975 | Lewicki | 2/425 |
| 4,044,400 | 8/1977 | Lewicki et al. | 2/421 |
| 4,068,323 | 1/1978 | Gwon . | |
| 4,075,714 | 2/1978 | Ryder et al. | 2/425 |
| 4,110,847 | 9/1978 | Dera | 2/421 |
| 4,115,874 | 9/1978 | Hasegawa | 2/425 |
| 4,117,553 | 10/1978 | Bay | 2/10 |
| 4,300,242 | 11/1981 | Nava et al. | 2/412 |
| 4,305,160 | 12/1981 | Sundahl | 2/424 |
| 4,434,514 | 3/1984 | Sundahl et al. | 2/425 |
| 4,449,275 | 5/1984 | Nava . | |
| 4,464,799 | 8/1984 | Nava | 2/421 |
| 4,466,138 | 8/1984 | Gessalin . | |
| 4,555,816 | 12/1985 | Broersma | 2/425 |
| 4,612,675 | 9/1986 | Broersma | 2/425 |
| 4,622,700 | 11/1986 | Sundahl | 2/425 |
| 4,627,115 | 12/1986 | Broersma | 2/425 |
| 4,653,123 | 3/1987 | Broersma . | |
| 4,766,616 | 8/1988 | Donahue | 2/422 |

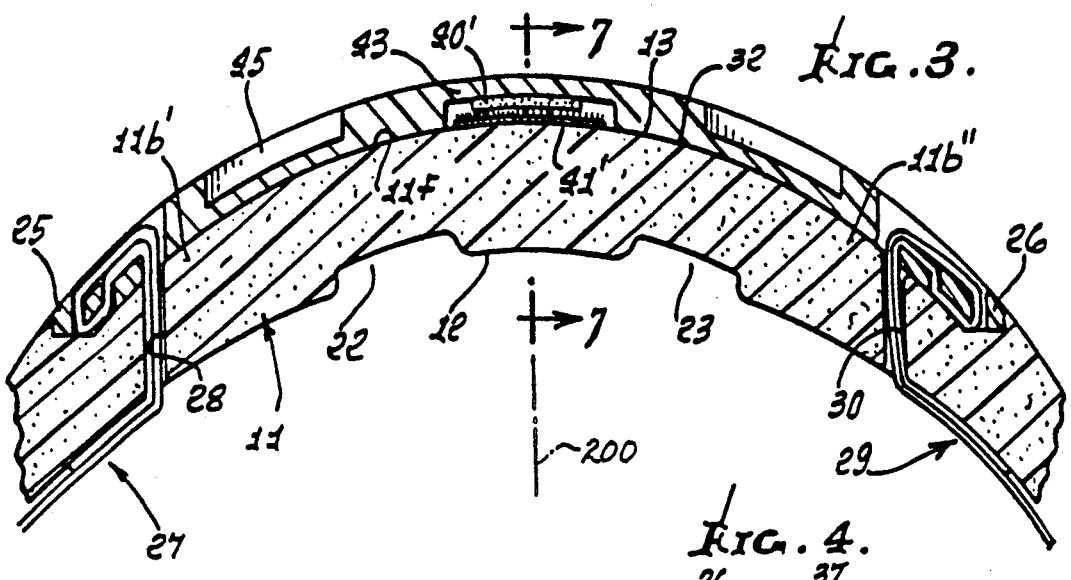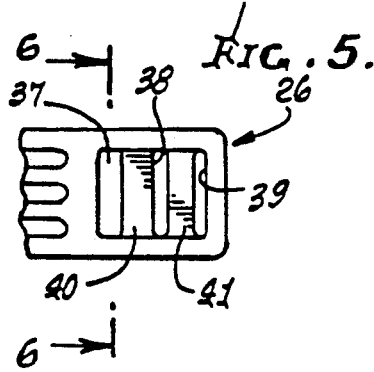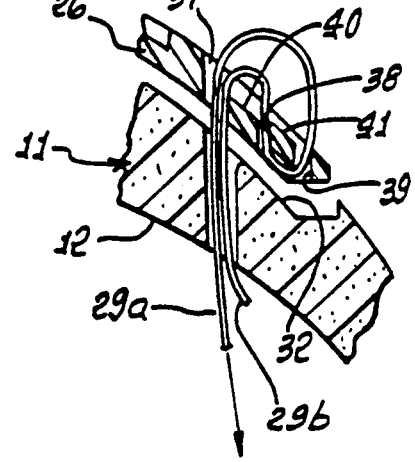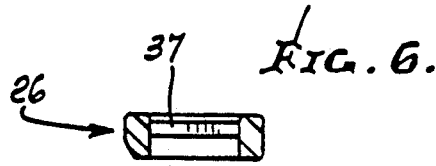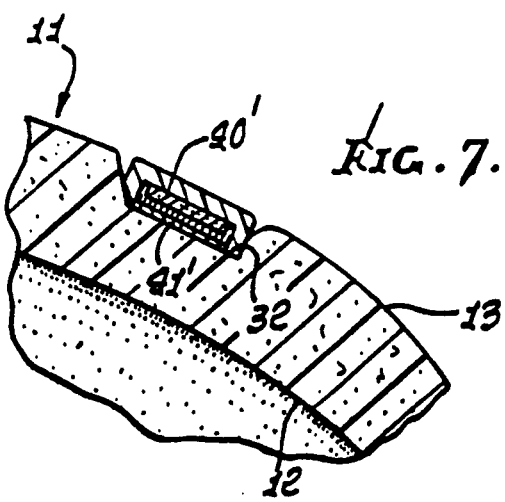

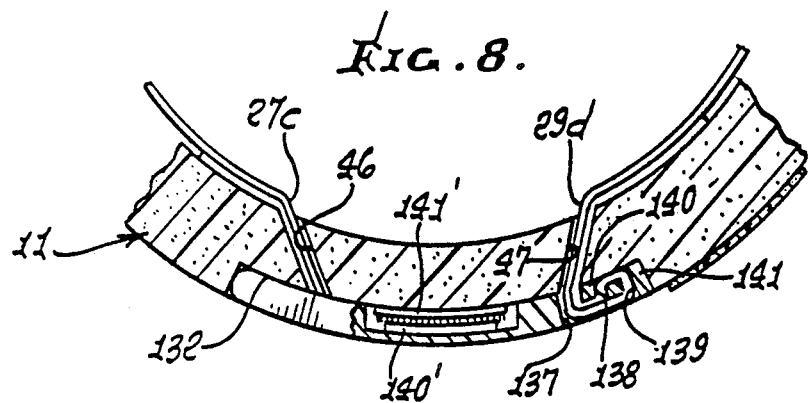
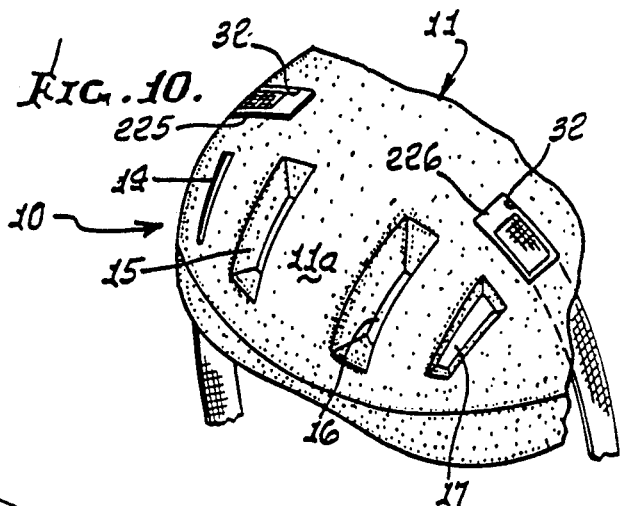
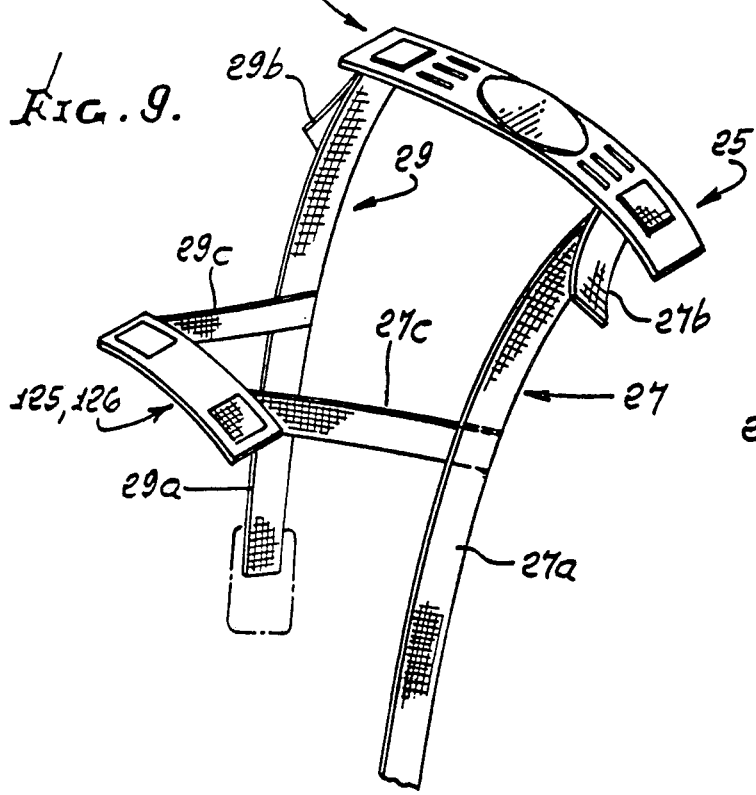
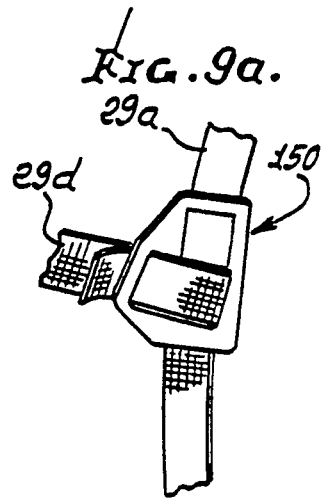

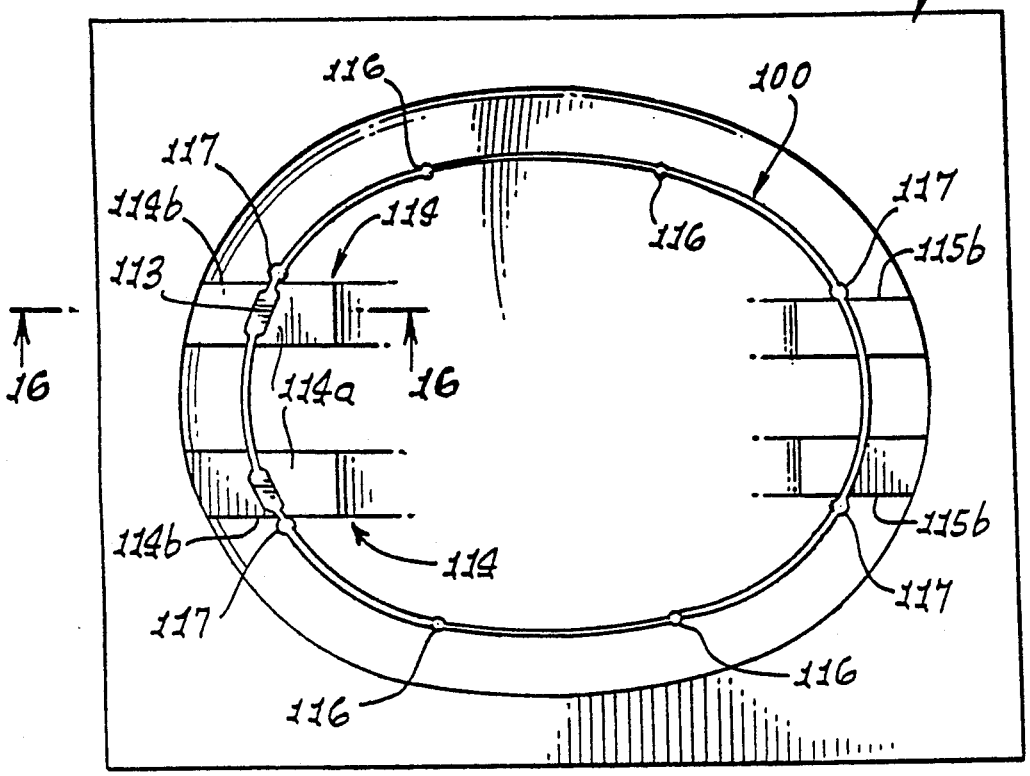
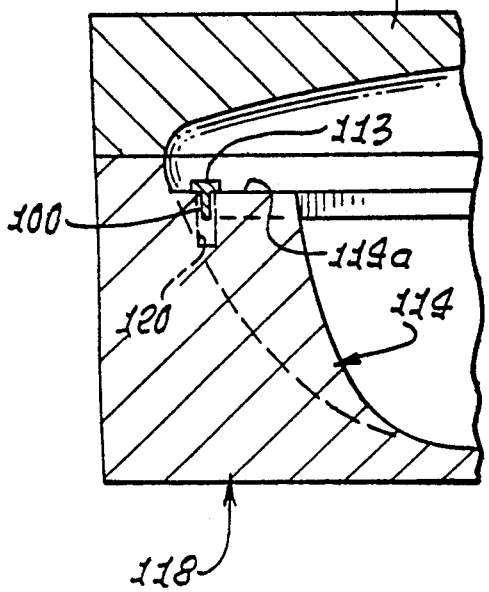
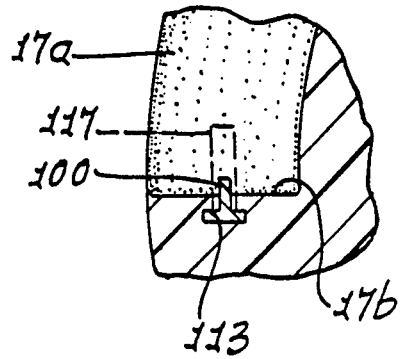

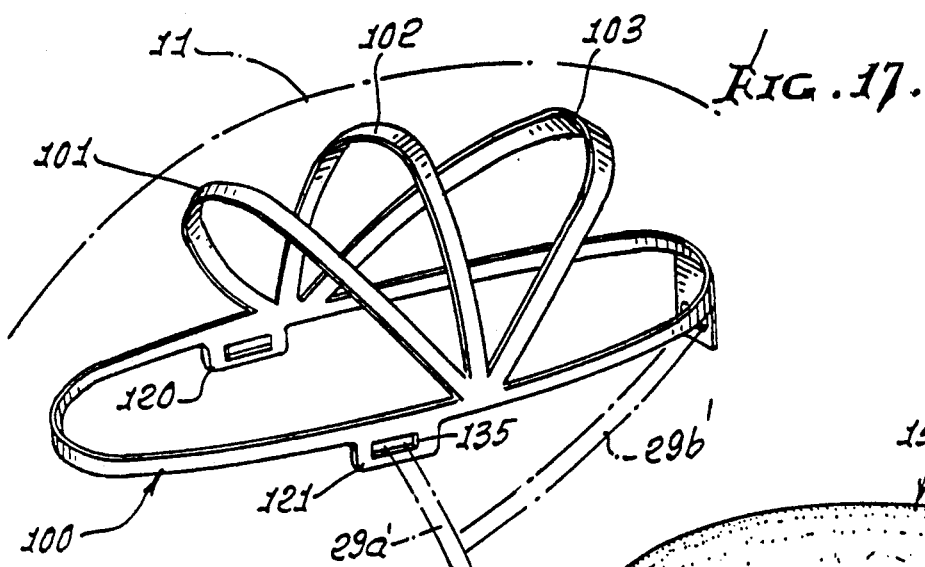
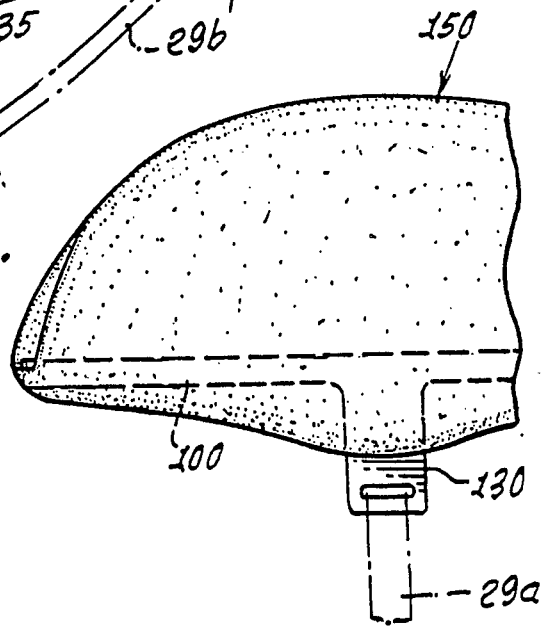
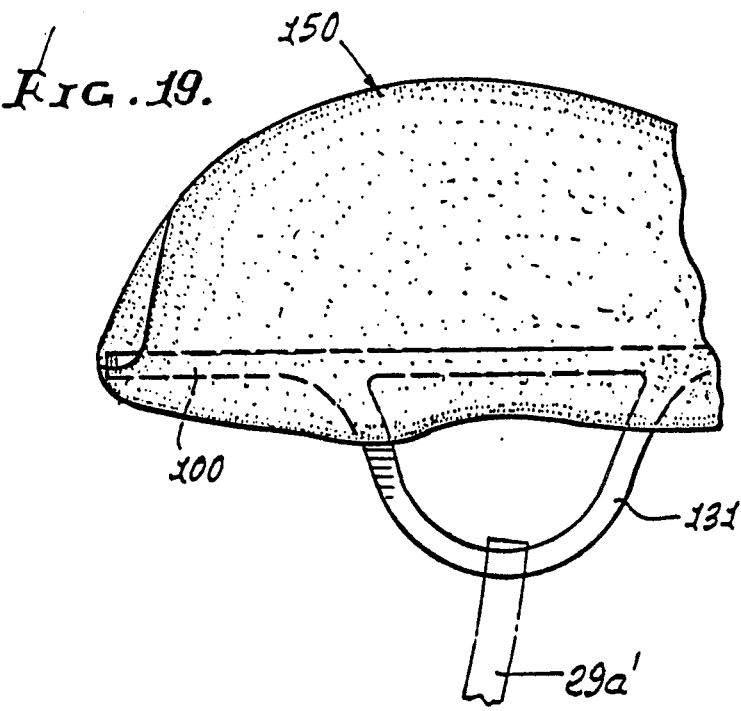

REINFORCED EXPANDED PLASTIC HELMET CONSTRUCTION

This is a continuation of application No. 07/646,462, filed Jan. 25, 1991, now U.S. Pat. No. 5,099,523, which was a continuation of application Ser. No. 07/273,827 filed Nov. 21, 1988, now abandoned, which is a continuation-in-part of Ser. No. 248,616 filed Sep. 26, 1988, now U.S. Pat. No. 4,903,348.

BACKGROUND OF THE INVENTION

This invention relates generally to reinforced helmets, and more particularly to a plastic molded helmet reinforced against fracture due to impact, as while retained to a wearer's head.

There is need for an improved plastic helmet, reinforced in a simple manner to prevent helmet fracturing, and so as not to interfere with normal molding or with helmet retention to the wearer's head. This need becomes more important in plastic helmets which contain multiple through openings (air vents and strap openings) which may reduce somewhat the helmet body resistance to cracking under high impact loads.

SUMMARY OF THE INVENTION

It is a major object of the invention to provide an improved helmet, such as a bicycle helmet, which comprises, basically:

a) a helmet body consisting of gas expanded synthetic resin, and having dome shape defining a lower edge extending generally in a loop, b) an elongated reinforcement member embedded in the helmet body to extend above said lower edge.

Typically, the reinforcement consists of high strength synthetic resin, such as nylon, and has band shape, the member oriented to have a lower edge projecting toward the helmet lower edge. Also, the reinforcement member may be curved to project with dome shape matching that of the helmet body to reinforce the top end of the helmet.

It is an additional object to provide locater means projecting on the member to locate it within the helmet body, in concealed condition, at the time of molding. A vent opening or openings may extend through the helmet body wall, and the reinforcement member may project edgewise slightly into that opening, to reinforce the opening defining edge structure of the body.

It is another object of the invention to provide openings through the body to pass retention straps; and in this environment a first strap holder is configured to be supported at and by the outer side of the helmet, the holder attached to at least one strap that extends through one of said openings, and the holder operable to transmit strap tension to the helmet. The reinforcement member is spaced from such openings.

It is yet another object to provide the holder in the form of a solid band received in a re-entrant recess at the top of the helmet, above the reinforcement member, having loop shape, and, the band and recess may very advantageously have arc shape, cross-wise of the helmet outer side. The helmet may also define a notch proximate a side of the recess for finger reception to lift the holder from the recess, the holder being releasably retained in the recess; and attachment means may be provided to positively attach the holder to the helmet at its outer side, the helmet body typically consisting of expanded polystyrene.

It is a further object of the invention to provide a second strap holder configured to be supported at and by the outer side of the helmet, the holder attached to at least one strap that extends through one of the said openings, and the holder operable to transmit strap tension to the helmet. The holders typically consist of solid material and have adjustable connections to said straps, the holders releasably attached to the helmet body to be lifted for effecting strap adjustment, and to be re-attached to the body. Also, the holders may be integrated.

An additional object is to provide a fabric cover fitting over the body and holder and retained to the body proximate the lower edge thereof.

These and other objects and advantages of the invention, as well as the details of an illustrative embodiment, will be more fully understood from the following specification and drawings, in which:

DRAWING DESCRIPTION

FIG. 3 is an enlarged section taken on lines 3—3 of FIG. 1;

FIG. 4 is a fragmentary section of a portion of FIG. 3, showing a loosened strap;

FIG. 5 is a partial plan view of a web lock;

FIG. 6 is a section on lines 6—6 of FIG. 5;

FIG. 7 is a vertical section taken on lines 7—7 of FIG. 3;

FIG. 8 is a horizontal section taken on lines 8—8 of FIG. 2;

FIG. 9 is a perspective view of a strap harness; and FIG. 9a shows an alternate harness as used in the FIG. 1 helmet connection;

FIG. 10 is a modification that depicts a fragmentary rear perspective view of a helmet having a two piece web lock;

FIG. 14 is a section on lines 14—14 of FIG. 13;

FIG. 15 is a plan view showing support of the reinforcement member in a mold, as during molding;

FIG. 16 is an enlarged section taken on lines 16—16 of FIG. 15;

FIG. 17 is a perspective view of a modified reinforcing band group in the form of a harness; and FIGS. 18 and 19 are side view of helmets with further modified reinforcing bands.

DETAILED DESCRIPTION

Figure 1:
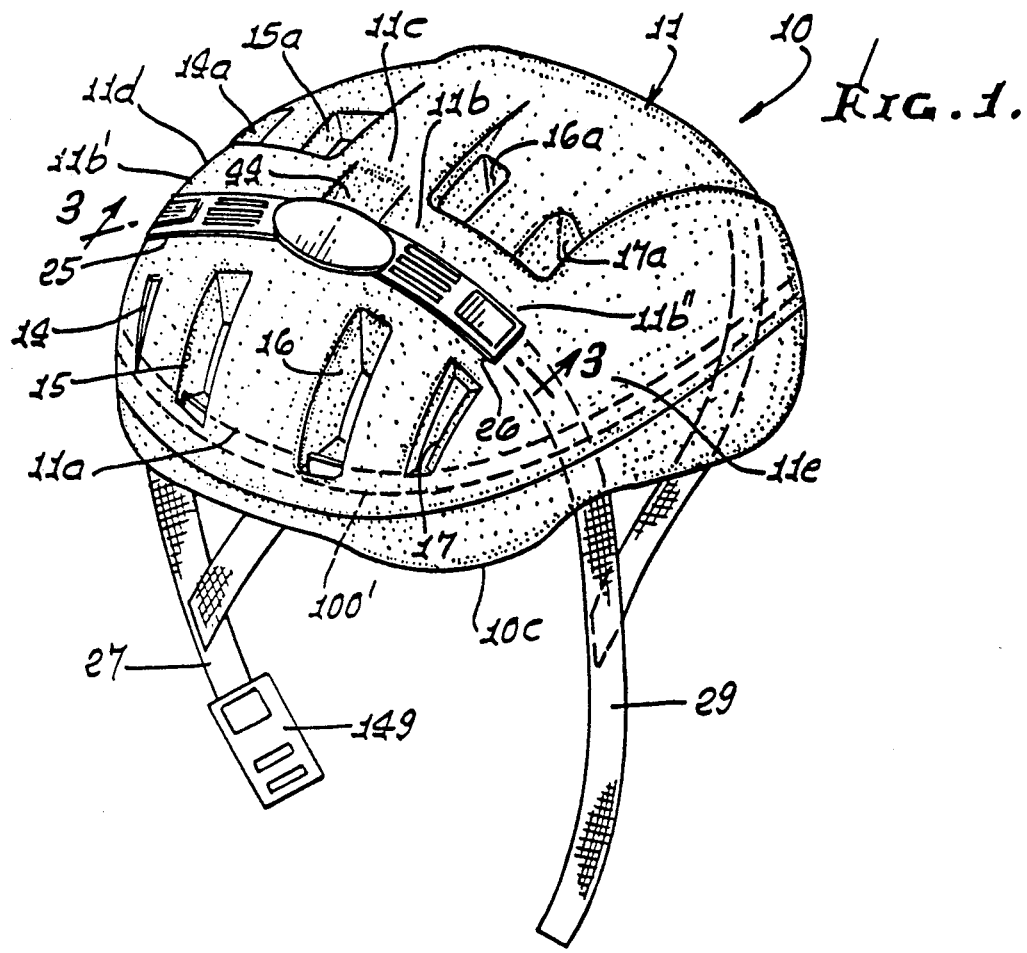
FIG. 1 is a frontal perspective view showing a reinforced helmet incorporating the invention.

In the drawings, the bicycle helmet 10 includes a generally dome shaped, foamed plastic body 11 having inner and outer surfaces or sides 12 and 13. Body 11 may consist of air expanded polystyrene. The manner in which a helmet body can molded from polysterene and like materials is known, generally, and does not without more constitute a part of this invention. An exemplary process for molding a helmet body is disclosed in U.S. Pat. No. 4,300,242. In accordance with the invention, any known method could be employed for molding the helmet body from polysterene or a like material. The body front 11a contains or defines four generally vertical openings 14–17 which are laterally spaced apart. Four rearward continuations 14a–17a of those openings are defined by an upper portion 11c of the body, forward of an upright plane that extend laterally and bisects the helmet into forward and rearward portions. Body portions 11b between the body portions 11a and 11c is uninterrupted by the air inlet openings, and extends laterally between regions 14d and 11e. The body rear extend 11f contains or defines four generally vertical openings 18–21 which are laterally spaced apart. Openings 15 and 16 extend through the shell-like body to constitute air inlet openings; and likewise, openings 19 and 20 extend through the body to constitute air discharge openings. Air flow passage 22 formed or sunk in the interior surface 12 guides or passes ventilation air from opening 15 to opening 19; and passage 23 also formed or sunk in surface 12 guides or passes air from opening 16 to opening 20. Openings 14, 17, 18, 21, and 14a–17a may constitute recesses simulating air passing openings. Openings 14a–17a typically extend through the body, i.e. to intersect inner side 12.

In this environment, an elongated reinforcement member 100, having band shape, is embedded in the helmet body to extend above the helmet lower edge 10c. The helmet body is molded about the band, which is typically metallic (for example steel). Thus, the band is formed from a material having a composition different than the helmet body. The band extends in a loop to provide hoop tension, under certain input loading conditions imposed on the helmet; for example, lateral spreading apart of the helmet at its lower edge portion is then prevented, to prevent helmet cracking, as adjacent openings through the helmet body. The upper edge of the band typically extends within the lowermost extents of the openings 19 and 20 to assure that the plastic body forming the openings is reinforced.

In one type helmet, which may be advantageously reinforced, a first strap holder, as at 25, is configured to be supported at and by the outer side of the helmet, as for example body portion 11b'; and likewise, a second strap holder, as at 26, is configured to be supported at and by the outer side of the helmet, as for example at body portion 11b". The body 11b includes 11b' at the right front, and portion 11b" at the left front, i.e. at opposite sides of a vertical plane 200 that extends front to rear and bisects the helmet. Holders 25 and 26 may be integral with one another to define a single holder which is arc shaped as is clear from FIG. 3; or they may be separate from one another, i.e. separately liftable from the helmet body, to allow strap adjustment.

Holder 25 is attached to a strap 27 that extends downwardly through a strap opening 28 in body 11, i.e. in body portion 11b'; and holder 26 is attached to a strap 29 that extends downwardly through a strap opening 30 in body 11, i.e. body portion 11b". Each holder 25 and 26 operates to transmit strap tension to the helmet body; thus, the holders, being arc shaped, fit the arc shaped lateral upper surface 11f the helmet, as for example at the bottom of a lateral groove 32 sunk downwardly in the body portion 11b, whereby the upper surfaces of the holders 25 and 26 are substantially flush with the main outer or upper surface of the helmet. Groove 32 extends across the body 11, as shown, above the level of the reinforcement member 100, as to openings 28 and 30.

The holder or holders 25 and 26 are liftable upwardly away from the helmet body, i.e. out of the groove 32, to allow strap adjustment-i.e., lengthening or shortening. In this regard, each holder defines slot means, through which its associated strap passes for adjustment retention. Accordingly, each strap is adjusted at a location at the top of the helmet, away from the face of the wearer, obviating need for any adjustment brackets or slots in plates next the wearer's face, which can irritate or disturb or distract the helmet wearer. As seen for example in FIGS. 3–5, band-like holder 26 defining through slots 37–39, and cross-pieces 40 and 41 extending crosswise of the slots, whereby strap lengths 29a and 29b extend upwardly through slot 37, then laterally over cross-piece 40, and then loop downwardly about cross-piece 39. This allows relative sliding adjustment of the strap sections or lengths 29a and 29b to lengthen or shorten strap length 29a that extends downward uninterruptedly adjacent the wearer's face; and this sliding adjustment is typically carried out while the holder is elevated relative to the body 11. See FIG. 4.

After completion of strap length adjustment, the arc-shaped holders 25 and 26 are lowered into position as seen in FIG. 3, in groove 32, and held therein. For example, a VELCRO (hook and pile) connection may be provided to releasably retain the hands or holders 25 and 26 in down position. See VELCRO sections 40' and 41' in FIGS. 3 and 27 section 40' carried by the body 11 at the bottom of the groove 32, and section 41' carried by the underside of the holder mid portion 43. The latter is between holders 25 and 26 and integral therewith, for example, providing one unit band.

The holders 25 and 26 may be forcibly lifted upwardly by exerting upward prying force to free the two hook and pile sections. In this regard, FIG. 1 shows a notch 44 proximate a side of the re-entrant recess 32 for fingers reception to lift the holder unit 25 and 26, and its upward arching mid portion 43, to allow strap adjustment above the helmet and body, as described. The holder unit may also contain lengthwise re-entrant slots 45, as shown.

FIG. 10 shows a modified helmet construction wherein the holders 225 and 226 are not connected by a mid-portion 43, but are separated, for downward reception in local recesses 32, at opposite sides of the helmet. Thus, each holder 225 and 226 in FIG. 10 is individually liftable from its recess 32, for strap adjustment, and locking when returned to recesses 32.

FIG. 9 shows a complete strap harness with holders 25 and 26. The harness also includes strap sections 27c and 29c and 29d, having their forward ends attached to sections 29a as shown. Rearward ends of the sections 27c and 29c pass through rearward openings 46 and 47 in the body 11 (see FIG. 8), and adjustably attach to holders 125 and 126 of an arc shaped rearward holder unit. The latter is received in a re-entrant rearward recess 132 in the body 11, and releasably retained therein as by VELCRO connection sections 140' and 141'. Thus, the holders 125 and 126 may be rearwardly separated from the body 11 to allow length adjustment of strap sections 29c and 27c. The latter have looping adjustable connection with holder cross-pieces 140 and 141, similar to cross-pieces 40 and 41. See associated slots 137–139 corresponding to slots 37–39. A tapered notch 44a is adapted to receive the wearer's finger to release (lift) the holder unit.

Figure 2:
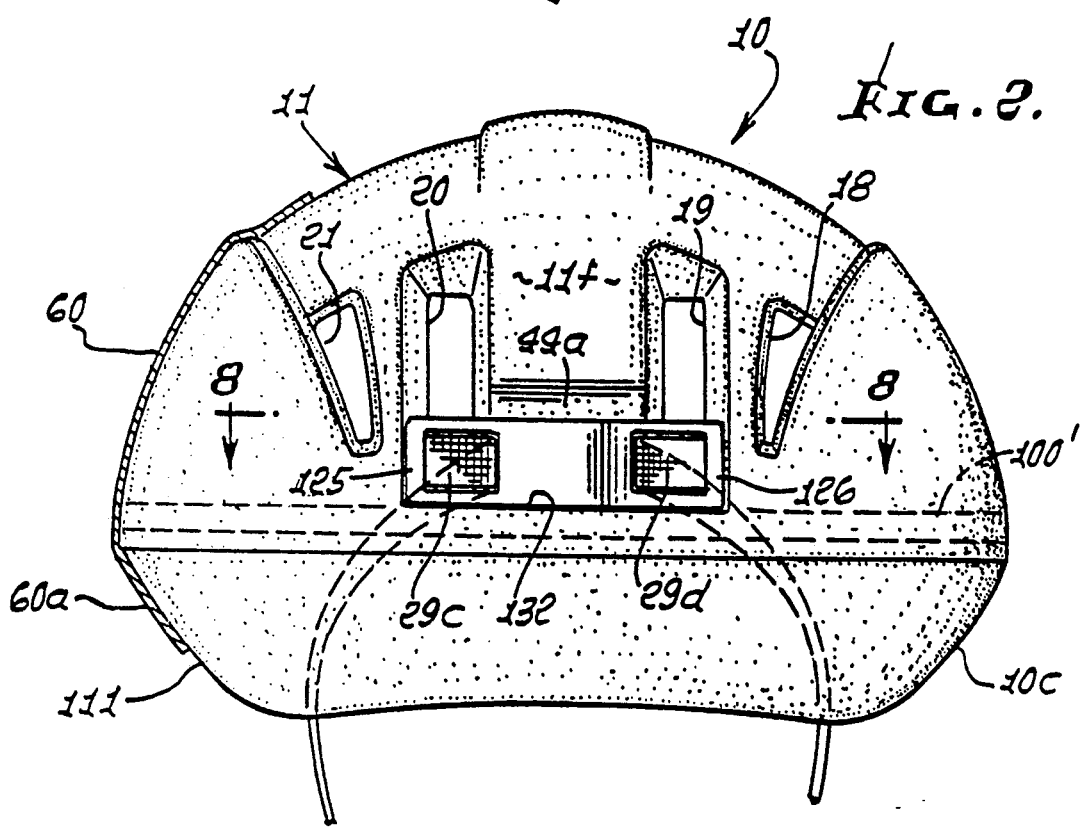
FIG. 2 is a rear elevation of the FIG. 1 helmet.

A net-like flexible and stretchable cover 60 may be fitted over the helmet to cover the holders and strap extents at the top of rear of the helmet, as seen in FIG. 2, the cover may have its lower edge portion 60a extending downwardly and inwardly along correspondingly slanted side wall extent 111 of the body 11 for retaining the cover in position.

FIG. 1 shows a buckle 149 to connect straps 27 and 29. In FIG. 9a, a clip 150, such as a plastic plate, is carried by the strap 29a, and the strap 29d attached to the clip, as shown.

Holders 125 and 126 may comprise a one-piece unit.

Figure 11:
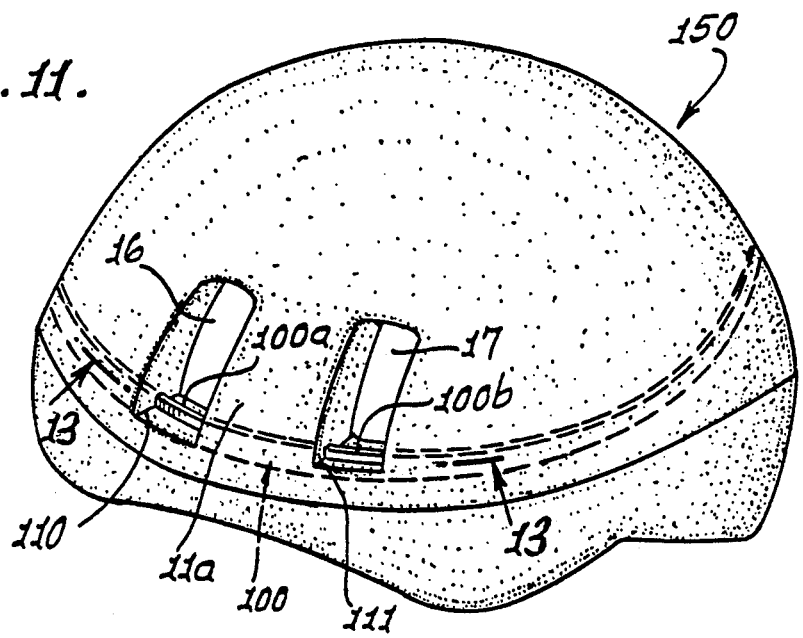
FIG. 11 is a view like FIG. 1, showing a modified helmet, reinforced in accordance with the invention.
Figure 12:
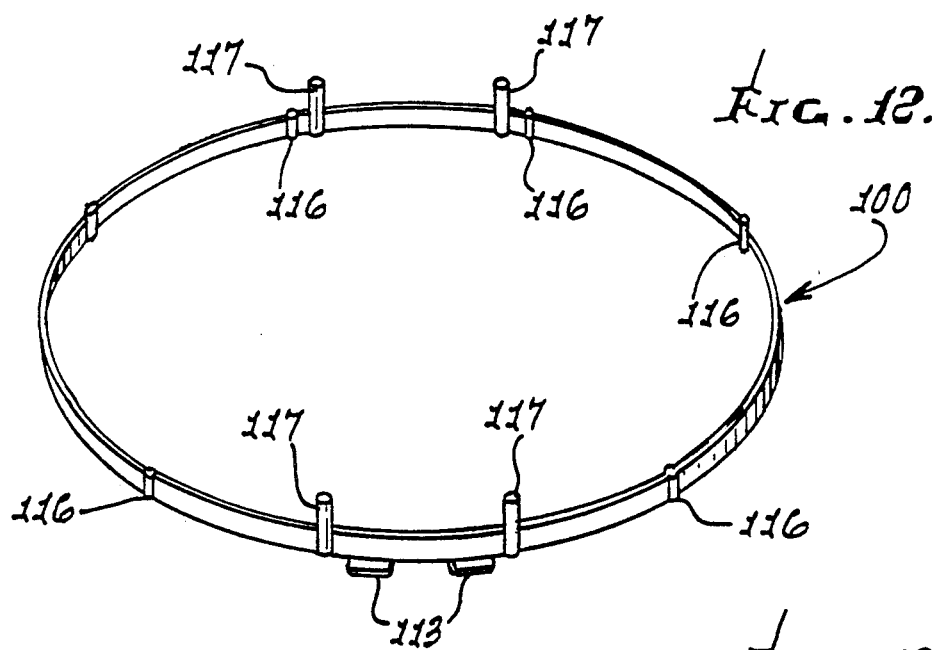
FIG. 12 is a perspective view showing a reinforcing band.

In FIG. 11, the helmet 150 is in many respects like that of FIG. 1 and 2, and so bears the same numbers for the corresponding elements. The reinforcement member or band 100 is embedded in the molded and gas expanded synthetic resin (polystyrene, for example) of the helmet body 111, closer to the helmet lower looping edge 10c than to the dome shaped top crown. FIG. 12 shows the looping band 100, which may be metallic. Note that the band is embedded in such manner that it is spaced inwardly from the inner and outer sides of the body, yet it projects upwardly at 100a and 100b into the lowermost extents of the two through openings 15 and 16 in the helmet front wall 11a, thereby to strengthen the plastic material that forms these openings, as at their sharp corner angles indicated at 110 and 111, where cracks could develop under impact stress, as during a bicycle rider's helmet impact with the ground or with an automobile.

Figure 13:
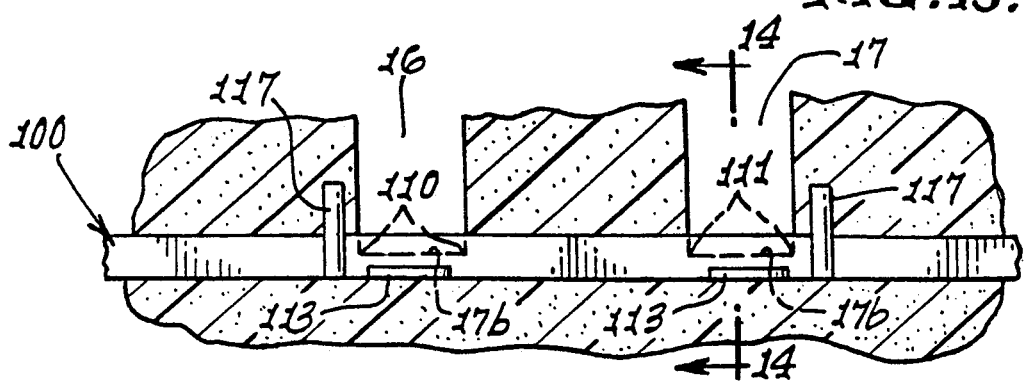
FIG. 13 is an enlarged fragmentary section taken on lines 13—13 of FIG. 11.

Locater means is provided integrally on the thin band 100 to project in such manner as to locate a portion of the band in the body of the helmet at the time of molding thereof. See in this regard flanges 113 that seat on the surfaces 114a of the mold bosses 114; the enlargements 117 that bear against the sides 114b and 115b of the bosses; and the posts 117 that project above the level of the band, as seen in FIG. 13, adjacent the vent openings 16 and 17, to reinforce the plastic material of the body. The mold base itself is indicated at 118, in FIGS. 15 and 16, and the mold cover at 119 in FIG. 16. The band 100 is received downwardly in slots 120 in bosses 114, seen in FIG. 16. FIG. 14 shows the side wall 17a of opening 17, and the band 100 projecting above the bottom wall 17b of the opening 17.

During installation of the band on the mold plate 108, the band 100 is twisted slightly, and deformed into oblong, elliptical shape, as shown, so as to best position the band in the helmet body during molding for maximum strength reinforcement.

FIG. 17 shows the provision of at least one, and preferably several additional band-shaped reinforcing members 101-103 which are elongated to extend within the helmet body of FIGS. 1 and 2, and/or 11, with arching extent between opposite sides of the helmet. The ends of the bands 101-103 are integral with the band 100 at opposite sides of the helmet body (indicated at 11). Lugs 120 and 121 on the band 100 project downwardly to retain the ends of straps 29a' and 29b', corresponding to straps 29a and 29b, discussed in FIG. 9. The lugs contain openings 135 via which the strap ends may be connected to the lugs.

FIGS. 18 and 19 show variations in which side lugs 130 and 131 are integral with the bands 100, and have different shapes, as shown, to retain strap 29'a.

In FIG. 1, a reinforcement band 100' is like that at 100 in FIG. 11 and is shown encapsulated in the helmet to extend above its lower edge.

I claim:
1. A helmet comprising:
a dome-shaped helmet body formed from gas expanded synthetic resin, said helmet body having inner and outer surfaces and a lower edge extending generally in a loop:
first elongated reinforcement means for reinforcing said helmet body to resist cracking under high impact loading, said first reinforcement means comprising at least one discrete elongated reinforcement member encapsulated in the helmet body and extending, spaced from said lower edge, around at least a substantial portion of the helmet body, through a predetermined, limited height thereof between said inner and outer surfaces, said one member defining a closed loop, each said reinforcement member of said first reinforcement means being formed from a material having a composition different from that of said body to reinforce said body.

2. The helmet of claim 1, wherein said first elongated reinforcement means comprises a single elongated reinforcement member which extends substantially entirely around the helmet body.

3. The helmet of claim 1, wherein said first elongated reinforcement member is band-shaped and is oriented to have a lower edge which projects towards the lower edge of the helmet.

4. The helmet of claim 1, wherein said first reinforcement means is formed from high strength synthetic resin.

5. The helmet of claim 1, further including locator means projecting from said first reinforcement means, to locate the same within the helmet body at the time of molding.

6. The helmet of claim 1, wherein said helmet body is formed from an expanded polystyrene.

7. A helmet comprising:
a dome-shaped helmet body formed from gas expanded synthetic resin, said helmet body having inner and outer surfaces and a lower edge extending generally in a loop;
first elongated reinforcement means for reinforcing said helmet body to resist cracking under high impact loading, said first reinforcement means comprising at least one discrete elongated reinforcement member encapsulated in the helmet body and extending, spaced from said lower edge, around at least a substantial portion of the helmet body, through a predetermined, limited height thereof between said inner and outer surfaces, said one member defining a closed loop, each said reinforcement member of said first reinforcement means being formed from a material having a composition different from that of said body to reinforce said body,
and further comprising second elongated reinforcement means for reinforcing said helmet body to resist cracking under high impact loading, said second reinforcement means comprising at least one discrete elongated reinforcement member encapsulated in the helmet body to extend through a predetermined, limited arc length thereof, said second reinforcement means being disposed in an arch having first and second lower ends and extending from one side of said helmet to another side of said helmet between said inner and outer surfaces, each said reinforcement member of said second reinforcement means being formed from a material having a composition different from that of said body to reinforce said body.

8. The helmet of claim 7, wherein at least one of said lower ends of said second reinforcement means is connected to said first reinforcement means.

9. A helmet comprising:
a dome-shaped helmet body formed from gas expanded synthetic resin, said helmet body having inner and outer surfaces and a lower edge extending generally in a loop;
first elongated reinforcement means for reinforcing said helmet body to resist cracking under high impact loading, said first reinforcement means comprising at least one discrete elongated reinforcement member encapsulated in the helmet body and extending, spaced from said lower edge, around at least a substantial portion of the helmet body, through a predetermined, limited height thereof between said inner and outer surfaces, said one member defining a closed loop, each said reinforcement member of said first reinforcement means being formed from a material having a composition different from that of said body to reinforce said body,
wherein said helmet body has an air vent opening defined therethrough, said first reinforcement means projecting partially into said air vent opening.

10. A helmet comprising:
a dome-shaped helmet body formed from gas expanded synthetic resin, said helmet body having inner and outer surfaces and a lower edge extending generally in a loop;
first elongated reinforcement means for reinforcing said helmet body to resist cracking under high impact loading, said first reinforcement means comprising at least one discrete elongated reinforcement member encapsulated in the helmet body and extending, spaced from said lower edge, around at least a substantial portion of the helmet body, through a predetermined, limited height thereof between said inner and outer surfaces, said one member defining a closed loop, each said reinforcement member of said first reinforcement means being formed from a material having a composition different from that of said body to reinforce said body,
and further comprising at least one opening defined through the helmet body to pass retention straps and a first strap holder configured to be supported at and by the outer surface of the helmet, the holder being attached to at least one strap that extends through one of said openings, the holder being operable to transmit strap tension to the helmet body.

11. The helmet of claim 10, further comprising attachment means for positively attaching the holder to the helmet body at said outer surface at an outer upper side thereof, said first reinforcement means being located generally below the level of said openings, said first reinforcement means being band-shaped and being oriented to have a lower edge projecting towards the helmet body lower edge.

12. The helmet of claim 11, wherein said attachment means comprise hook and pile elements one of which is carried by the holder and other which is carried by the helmet body above the level of said first reinforcement means.

13. The helmet as in claim 10, wherein the holder defines slot means through which the strap passes to adjustably tension the same.

14. A helmet as in claim 10, further comprising a second strap holder configured to be supported at and by the outer surface of the helmet body, said second holder being attached to a second strap that extends through another of said openings, the second holder being operable to transmit second strap tension from said second strap to the helmet body.

15. The helmet of claim 14, wherein said two strap holders are interconnected and said two interconnected strap holders form an arch adapted to conform to a curvature of the helmet body.

16. The helmet of claim 14, wherein said two holders are carried at a forward portion of the helmet body and further comprising a third holder configured to be supported by the outer surface of the helmet body at a rearward portion thereof, the third holder attached to a third strap that extends through another of said openings.

17. A helmet comprising:
a dome-shaped helmet body formed from gas expanded synthetic resin, said helmet body having inner and outer surfaces and a lower edge extending generally in a loop;
first elongated reinforcement means for reinforcing said helmet body to resist cracking under high impact loading, said first reinforcement means comprising at least one discrete elongated reinforcement member encapsulated in the helmet body and extending, spaced from said lower edge, around at least a substantial portion of the helmet body, through a predetermined, limited height thereof between said inner and outer surfaces, said one member defining a closed loop, each said reinforcement member of said first reinforcement means being formed from a material having a composition different from that of said body to reinforce said body,
and further including a fabric cover mounted over the helmet body and retained to the helmet body proximate the lower edge thereof.

18. A helmet comprising:
a dome-shaped helmet body formed from gas expanded synthetic resin, said helmet body having inner and outer surfaces and a lower edge extending generally in a loop;
arch-shaped reinforcement means for reinforcing said helmet body to resist cracking under high impact loading, said arch-shaped reinforcement means having first and second lower ends and extending substantially from one side of said helmet to another side of said helmet between said inner and outer surfaces, said arch-shaped reinforcement means comprising at least one discrete elongated reinforcement member encapsulated in the helmet body to extend through a predetermined, limited arc length thereof, each said reinforcement member of said arch-shaped reinforcement means being formed from a material having a composition different from that of said body to reinforce said body; and
looping reinforcement means for reinforcing said helmet body to resist cracking under high impact loading, said looping reinforcement means comprising at least one discrete elongated reinforcement member encapsulated in the helmet body and extending, spaced from said lower edge, around at least a substantial portion of the helmet body, through a predetermined, limited height thereof between said inner and outer surfaces, each said reinforcement member of said looping reinforcement means being formed from a material having a composition different from that of said body to reinforce said body.

* * * * *